United States Patent [19]

Bush, deceased

[11] Patent Number: 4,505,200
[45] Date of Patent: Mar. 19, 1985

[54] DYNAMIC SEAL

[75] Inventor: Clarence C. Bush, deceased, late of Bel Air, Md., by Florence F. Bush, administratrix

[73] Assignee: The United States of America as represented by the Secretary of the Army, Washington, D.C.

[21] Appl. No.: 463,185

[22] Filed: Feb. 2, 1983

[51] Int. Cl.³ .............................................. F42B 13/46
[52] U.S. Cl. .................................. 102/293; 102/367; 102/370; 102/477
[58] Field of Search ............... 102/367, 370, 364, 365, 102/477, 705, 293

[56] References Cited

U.S. PATENT DOCUMENTS

| | | | |
|---|---|---|---|
| 494,696 | 4/1893 | Winslow | 102/477 |
| 1,316,148 | 9/1919 | Enequist | 102/370 |
| 4,383,485 | 5/1983 | Coates et al. | 102/364 |

FOREIGN PATENT DOCUMENTS 172580 12/1921 United Kingdom ................ 102/477

Primary Examiner—Charles T. Jordan
Attorney, Agent, or Firm—Anthony T. Lane; Robert P. Gibson; Edward F. Costigan

[57] ABSTRACT

There is disclosing a novel dynamic seal for a projectile having an internal chamber for cylindrical canisters of discrete liquids wherein a circumferential gap is formed between adjacent canisters in said chamber. The seal comprises a ring member which is formed of an elastomeric material and possesses an annular chamber containing a deformable substance of relatively high density. The ring member is juxtaposed about said circumferential gap so that by the centrifugal force of the spinning projectile the ring member is deformed and forced radially against said gap, thereby sealing and preventing leakage of liquid through said gap.

9 Claims, 5 Drawing Figures

DYNAMIC SEAL

GOVERNMENTAL INTEREST

The invention described herein may be manufactured, used and licensed by or for the Government for Governmental purposes without the payment to me of any royalties thereon.

FIELD OF THE INVENTION

This invention relates to a dynamic seal for a projectile, and more particularly to a simple and compact dynamic seal for a projectile to prevent the flow of liquid therefrom.

BACKGROUND OF THE INVENTION

Presently, there are artillery projectiles filled with liquids each contained in separate, sealed metal canisters positioned end to end. When the diaphragms of the mating ends of the canisters are ruptured the resultant mixture of liquid produces a toxic substance.

To control costs and to facilitate assembly of the canisters into projectiles in the field, it is desirable to employ "loose tolerances" in the design of the canisters. Therefore, a special seal in the projectile is required to prevent leakage and dispersion of the toxic substance over friendly troops prior to the projectile reaching its intended destination.

It has been found that a static seal, such as a clamped gasket is inefficient. Additionally, chevron-type blade shaft-seals and solid O-ring type seals are examples of seals where the advancing pressure tends to force the seal into tighter contact with the mating structure to increase the seal's effectiveness as the pressure against the seal is increased, rather than deforming or distorting the seal so as to conform its shape to the chamber or cavity.

Alternatively, dynamic seals presently are driven by centrifugal force and demonstrate an increased sealing pressure as the spin rate is increased, require the utilization of external weights, levers and springs to facilitate their operation.

OBJECTS OF THE INVENTION

An object of the present invention is to provide a novel dynamic seal of the centrifugal force type for a projectile.

Another object of the present invention is to provide a novel dynamic seal of the centrifugal force type for a projectile which conforms its shape to the projectile when activated by rotational or centrifugal force.

Still another object of the present invention is to provide a novel dynamic seal of projectile which prevents the dispersion of any substance from the projectile prior to projectile impact at its destination.

SUMMARY OF THE INVENTION

These and other objects of the present invention are achieved by a dynamic seal for a projectile having an internal chamber for cylindrical canisters of discrete liquids wherein a circumferential gap is formed between adjacent canisters in said chamber. The seal comprises a ring member which is formed of an elastomeric material and possesses an annular chamber containing a deformable substance of relatively high density. The ring member is juxtaposed about said circumferential gap so that by the centrifugal force of the spinning projectile the ring member is deformed and forced radially against said gap, thereby sealing and preventing leakage of liquid through said gap.

BRIEF DESCRIPTION OF THE DRAWINGS

Other objects and advantages of the present invention will become apparent by reference to the following detailed description of embodiments thereof when taken in conjunction with the accompanying drawings, wherein like numerals indicate like parts, in which.

DETAILED DESCRIPTION OF THE INVENTION

Figure 1:
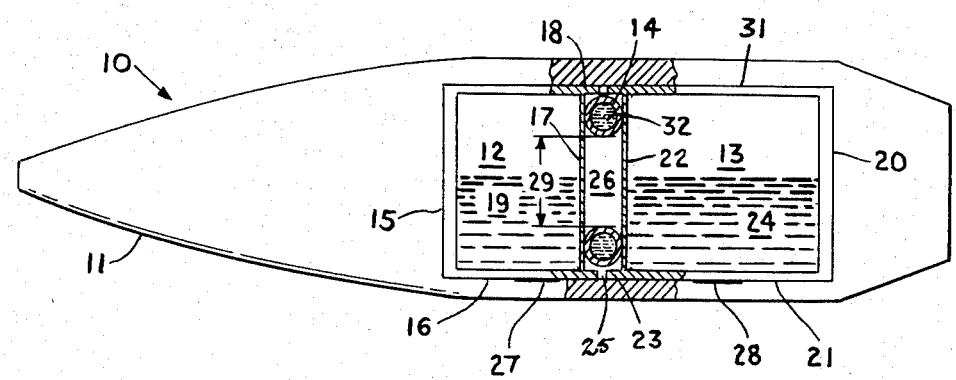
FIG. 1 is a cross-sectional view of a binary liquid-filled projectile showing the present invention.

Referring now to FIG. 1 there is shown a binary liquid-filled projectile, generally indicated as 10, comprised of a casing 11 having an internal or projectile chamber 31 containing a forward canister 12, a rear canister 13 and a torus 14.

The forward canister 12 is formed by a top wall 15, a cylindrical side wall 16 and a mating diaphragm 17. Perpendicularly disposed and peripherally located to the mating diaphragm 17 there is formed an annular shoulder portion 18. Contained within and partially filling the forward canister 12 is a first non-toxic liquid 19.

The rear canister 13 is formed by a rear wall 20, a cylindrical side wall 21 and a mating diaphragm 22. Perpendicularly-disposed and peripherally located to the mating diaphragm 22, there is formed an annular shoulder portion 23. Contained within and partially filling the rear canister 13 is a second non-toxic liquid 24.

The forward canister 12 and rear canister 13 are positioned in said chamber 31 of said casing 11 in end-to-end relationship and in close proximity leaving a circumferential gap 25. Cooperatively formed by peripheral annular shoulder portion 18 and mating diaphragm 17 of forward canister 12 and peripheral annular shoulder portion 23 and mating diaphragm 22 of rear canister 13 is cavity 26. The angular positions of the forward canister 12 and the rear canister 13 in the projectile chamber 31 is fixed by keys, 27 and 28 respectively, so as to cause the canisters to rotate with the projectile.

The projectile also contains conventional means (not shown) for expelling its contents upon reaching the target area, comprising a fuze and a propellant charge for expelling the contents e.g. canisters, submunitions, etc., through the rear of the projectile with sufficient force to rupture the threads for attaching the base plug (not shown) to the rear of the projectile. The fuze is operational and is set to initiate the explusion charge a few seconds prior to impact.

The torus 14 is formed of a rubber or rubber-like substance, having a hollow-sectioned core 32. The torus 14 is preferably filled with a deformable filler material, such as mercury, sand or small sized spherical lead shot having a density greater than that of the liquid toxic substance and of a particle size relatively smaller than the wall thickness of the torus 14. The torus 14 may be a hollow "O-ring" or disc-shaped. When filling the core 32 of the torus 14 it is not necessary or desirable to fill the core 32 to a point of being statically pressurized.

The torus 14 is positioned loosely within the cavity 26 so as to bridge the circumferential gap 25 between the end of annular shoulder 18 of forward canister 12 and the end of annular shoulder 23 of rear canister 13. In a static mode, the torus 14 has a diameter, indicated as 29.

Figure 2:
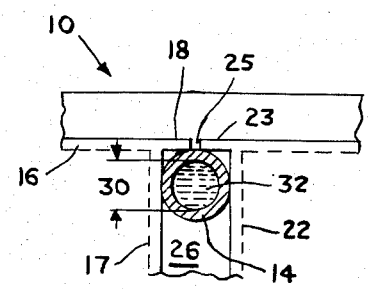
FIG. 2 is an enlarged partial cross-sectional view of an embodiment of the present invention in a static mode.
Figure 3:
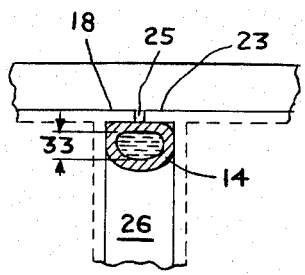
FIG. 3 is an enlarged partial cross-sectional view of the embodiment of FIG. 2 in a dynamic mode.

Referring now to FIG. 2, there is shown the projectile 10 in a static mode with the torus 14 having a constant radial dimension 30 in such static mode. When the projectile is fired through a rifled gun bore, the rotational spin of the projectile 10 causes the resultant centrifugal force on the filler material to increase the radial pressure outwardly against the torus 14 thereby to deform or distort the torus 14 axially as shown in FIG. 3, and seal completely the gap 25 as well as the surface of the seal retaining cavity 26 from corner to corner, conforming to the said cavity 26 from corner to corner, and any other irregularities. The torus 14, now has a smaller distorted radial dimension, indicated as 33 as a result of the acting centrifugal forces.

Also, setback and drag forces cause the liquid to press against and rupture the thin diaphragms 17 and 22, forcing liquid 24 into the forward canister 12 and initiating mixing of the liquids to react to form the toxic liquid, which is energetically continued by the centrifugal force produced by projectile spin. On reaching the target area, the fuze functions and the expulsion charge generates a large pressure against the top wall 15 of the forward canister 12, which ultimately causes the base plug threads to shear and the base plug and canisters to be ejected through the rear of the projectile, thereby dispersing the liquid payload into the airstream.

By employing in the torus a filler material of substantially greater density than the liquids present in the canisters to produce a substantially higher radial pressure resulting from the centrifugal force of the projectile spin, the torus 14 seals the circumferential gap 25 and prevents leakage of the toxic liquid substance from the projectile before the projectile arrives at the target.

The mass density of the filler material within the torus 14 is several times that of the liquids and toxic liquid formed and therefore the sealing pressure is primarily dependent upon this mass density, the rotational spin rate of the projectile 10, the diameter of the torus 14, and the distorted radial dimension 33 of the torus 14. The resistance of the material of construction of the torus to cross-sectional deformation and to stretch will also influence the effectiveness of the torus 14 as a seal.

Figure 4:
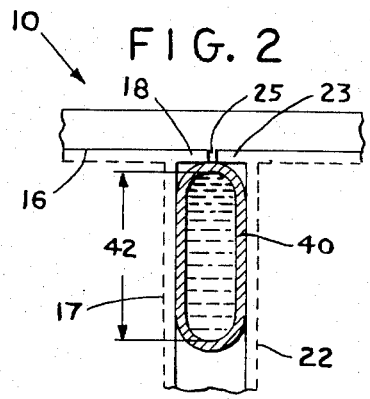
FIG. 4 is an enlarged partial cross-sectional view of another embodiment of the present invention in a static mode.
Figure 5:
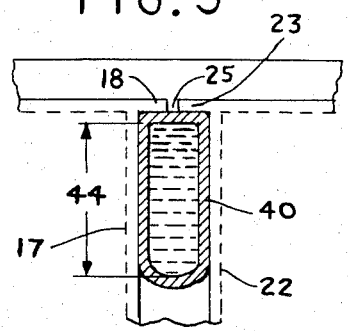
FIG. 5 is an enlarged partial cross-sectional view of the embodiment of FIG. 4 in a dynamic mode.

Now referring to FIGS. 4 and 5, increasing the radial dimension of the seal torus 40, through the use of a flattened disc-ring will improve the sealing performance. The disc ring torus 40 has a relatively large static radial dimension indicated as 42; and after the firing of the projectile as described above assumes the distorted radial dimension shown as 44. By further increasing the radial dimension to the extreme, the torus would assume the shape of a thin shelled disc and produce maximum sealing pressure at its outer extremities as a result of the centrifugal forces.

Although the dynamic seal of the present invention has been specifically disclosed with reference to a projectile, the principle is applicable to shaft oil seals, and in similar equipment as understood by one skilled in the art.

Numerous modifications and variations of the above disclosed invention are possible in light of the above teachings and therefore, within the scope of the appended claims the invention may be practiced otherwise than as particularly claimed.

We claim:

1. A dynamic seal for a projectile having an internal chamber for canisters of discrete liquids, and a circumferential gap between adjacent canisters thereof, comprising a ring member formed of an elastomeric material with an annular chamber positionable about said circumferential gap, and a deformable substance disposed in said annular chamber of said ring member.

2. The dynamic seal for a projectile as defined in claim 1, wherein said canisters of discrete liquids are of cylindrical shape formed by a top wall, side wall and rupturable mating diaphragm having a peripherally located and perpendicularly disposed end wall to said mating diaphragm and are coaxially positioned in said internal chamber; said mating diaphragms and said end walls cooperatively forming an intermediate chamber including said circumferential gap formed between said end walls of adjacent canisters and said ring member being disposed about said end walls to bridge said circumferential gap in said intermediate chamber.

3. The dynamic seal for a projectile as defined in claims 1 or 2 wherein said deformable substance contained in said ring member has a mass density greater than the mass density of the discrete liquids in said canisters.

4. The dynamic seal for a projectile as defined in claim 3 wherein said deformable substance is mercury.

5. The dynamic seal for a projectile as defined in claim 3 wherein said deformable substance is sand.

6. The dynamic seal for a projectile as defined in claim 3 wherein said deformable substance is spherical lead shot having a diameter less than the wall thickness of said ring member.

7. The dynamic seal for a projectile as defined in claims 1 or 2 wherein said ring member is a hollow O-ring.

8. The dynamic seal for a projectile as defined in claims 1 or 2 wherein said ring member is a hollow disc.

9. The dynamic seal for a projectile as defined in claim 2 wherein said dynamic seal deforms in shape under the influence of centrifugal force arising out of the rotational spin of the projectile to conform to said end walls and said mating diaphragm forming said intermediate chamber.

* * * * *